Feb. 18, 1958 E. O. OLSON 2,823,954
UNITARY SPRAY NOZZLE AND FILTER ASSEMBLY
Filed Sept. 10, 1956
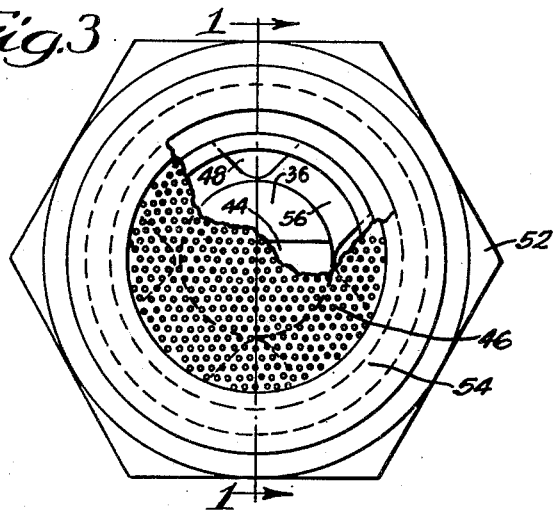
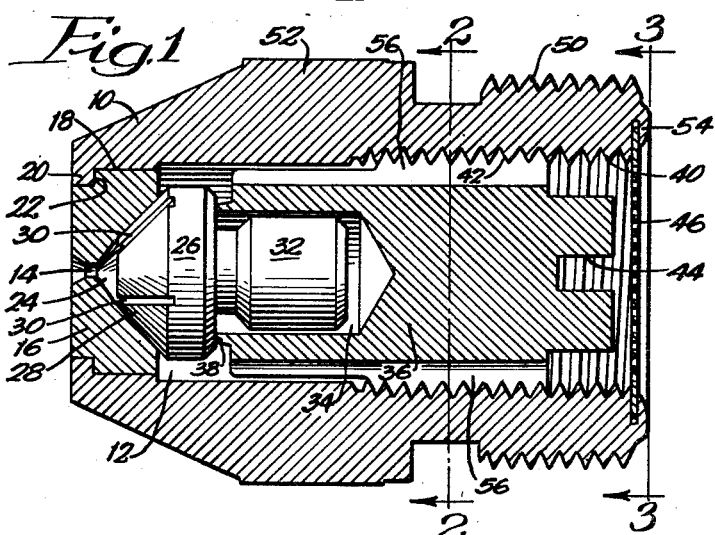
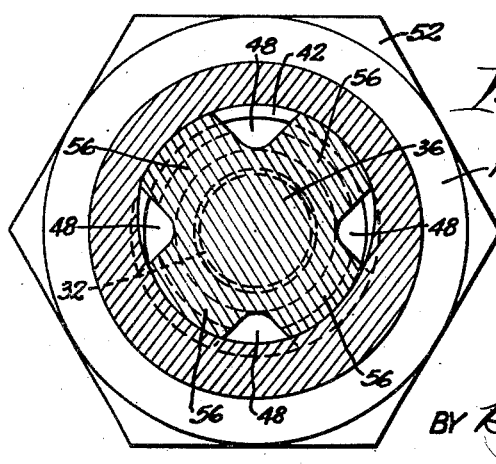
INVENTOR:
Eugene O. Olson,
BY Bair, Freeman & Molinare
ATTORNEYS.

United States Patent Office

2,823,954
Patented Feb. 18, 1958

2,823,954

UNITARY SPRAY NOZZLE AND FILTER ASSEMBLY

Eugene O. Olson, Des Moines, Iowa, assignor to Delavan Manufacturing Company, West Des Moines, Iowa, a corporation of Iowa Application September 10, 1956, Serial No. 608,756

1 Claim. (Cl. 299—107)

This invention relates generally to improvements in spray nozzles and specifically to improvements in spray nozzle and filter assemblies for spraying liquids in atomized form. The present disclosure constitutes a continuation-in-part of my copending application Serial No. 487,902, filed February 14, 1955, now issued as Patent 2,772,120.

One of the most serious problems in spray nozzle construction arises as a result of the narrowly constricted flow passage or passages which generally are present at some point in the nozzle along the flow path from the liquid source to the nozzle orifice. The nature of the liquid materials sprayed from such nozzles is often such that clogging occurs at some point of narrow constriction or at the nozzle orifice itself. This generally is due to the presence of objectionable foreign matter in the fluid.

Conventionally, some form of filter is associated with the nozzle and is placed in the path of liquid flow to prevent the foreign matter in the liquid from clogging the nozzle. In many prior art nozzle constructions, the filter utilized with the spray nozzle has not proved entirely satisfactory with the attendant result that either the nozzle or the filter itself becomes clogged after relatively short use, thereby impairing performance of the nozzle and necessitating the cleaning, repair and/or replacement of parts thereof.

The primary object of this invention is to provide an improved spray nozzle and filter assembly.

It is another object of this invention to provide an improved spray nozzle and filter assembly which is characterized by its highly efficient and substantially clog-free performance over relatively long periods of use.

It is still another object of this invention to provide an improved spray nozzle and filter assembly which due to its improved clog-free characteristics does not require frequent disassembly for cleaning and replacement of parts and which therefore is advantageously adapted to integral unit construction in which the filter is locked in to prevent contamination and tampering.

It is a further object of this invention to provide an improved and highly efficient integrally composite spray nozzle and filter unit which is compact and inexpensive to manufacture.

In accordance with features of a specific illustrative embodiment of this invention the improved spray nozzle and filter assembly comprises a housing having an orifice at one end thereof and a disk filter formed of perforated sheet material or fine wire mesh at the other end thereof. The housing is provided with an internally threaded cylindrical bore which is adapted to receive an externally threaded screw pin therewithin. It is an important aspect of this invention that the screw pin is of noncylindrical cross section to the end that a plurality of liquid flow passages are provided between the screw pin and the walls of the cylindrical opening. Thus, liquid supplied to the nozzle at its filter end flows through the passages defined by the screw pin and the housing to the orifice at the other end of the nozzle.

Advantageously a distributor plug is provided between the screw pin and the orifice. The distributor plug has a plurality of angularly disposed grooves, occasionally hereafter defined as swirl slots, adapted to permit flow of the liquid past the plug to the orifice and to simultaneously impart vortical flow to the liquid as it is forced through the nozzle. The depth of the grooves or slots comprises the smallest dimension of any flow passage in the nozzle. Accordingly, there is the serious consequence that objectionable particles of foreign matter which pass through the filter may become lodged in the grooves or slots and clog the nozzle. Attempts to eliminate this troublesome difficulty by providing the filter with openings very much smaller than the slot depth have proved unsuccessful since such attempts have resulted in contamination and plugging of the filter with consequent detrimental effects in the operating efficiency and life of the filter.

It is an important feature of this invention that the relationship between the smallest functional dimension of the nozzle, that is, the depth of the angularly disposed grooves or swirl slots, and the size of the openings in the filter is such as to minimize the aforementioned difficulties. More specifically it is an important feature of this invention that the openings in the filter be of a size approximately one-half of the depth of the slots. This structural relationship has proved highly successful in substantially eliminating nozzle clogging due to the entrance of objectionable foreign matter in the liquid and in permitting relatively long operation of the filter without impairing performance of the nozzle.

It also has been found that when certain liquids such as fuel oil and the like are used in a spray nozzle, clogging of the nozzle sometimes occurs because of the cracking and sludge formation in the fuel resident in the nozzle. Additionally, when a spray nozzle is used with an oil burner there sometimes is present an undesirable condition known as "afterdrip" which is caused by expansion of the fuel in the nozzle after burner shut-down. In accordance with another feature of this invention these objectionable conditions resulting from the presence of oil in the nozzle are effectively overcome by constructing the screw pin to minimize the quantity of oil resident in the cylindrical bore of the nozzle. Thus, the above described resultant effects of such oil are substantially reduced.

The above and other features of novelty which characterize the invention are pointed out with particularity in the claims appended to and forming a part of this specification. For a better understanding of the invention, however, its advantages and specific objects attained by its use reference is had to the accompanying drawing and descriptive material in which is shown and described an illustrative embodiment of the invention.

In the drawing:

Figure 1 is an axial cross sectional view of a spray nozzle and filter assembly embodying the invention;

Figure 2 is a transverse cross sectional view taken substantially as shown along line 2—2 of Figure 1; and Figure 3 is an end view of the spray nozzle and filter assembly taken substantially as shown along line 3—3 of Figure 1.

Referring now to the drawing in which is disclosed a preferred form of the invention, the housing 10 is generally cylindrical in shape having a central axial bore 12 terminating in an orifice 14 at the discharge end. Advantageously the orifice 14 is formed in a separate orifice piece or nib 16 adapted to be slidably fitted into the bore 12 from the upstream or inlet end of the housing 10. It will be appreciated, however, that the nib 16 may be integrally formed with the housing 10 if desired. The discharge end of the bore 12 is of reduced diameter, as indicated at 18, and terminates in an inwardly extending circumferential flange 20. The flange 20 cooperates with a complementary shoulder 22 formed in the outer face of nib 16 to enable the nib 16 to be positioned in tight fitting relation within housing 10. The inner face of nib 16 is formed with a conical shaped opening 24 which terminates in the discharge orifice 14.

A distributor plug 26 having a frusto-conical nose 28 is disposed within the opening 24 to direct the flow of liquid through orifice 14. Advantageously, the slope of nose 28 of the plug 26 corresponds with the slope of the opening 24 to the end that plug 26 may be positioned in leak tight contact with opening 24. A plurality of angularly disposed grooves or swirl slots 30 are provided in the surface of nose 28 to permit the flow of liquid past the head of plug 26 to the orifice 14 and for simultaneously imparting vortical flow to the liquid being forced through the nozzle. Plug 26 has a boss 32 projecting from the rear of nose 28 which is adapted to be positioned within an axially located opening 34 in one end of screw pin 36 for supporting the upstream end of the plug 26 within the housing 10. Advantageously the shoulder 38 of screw pin 36 is in pressure sealing contact with the rear face of nose 28.

In accordance with an important aspect of this invention the upstream wall portion of axial bore 12 is provided with an internal thread 40 and the upstream circumferential surface of the screw pin 36 is provided with an external thread 42 to the end that screw pin 36 may be readily positioned within housing 10 and in a manner to maintain nose 28 of distributor plug 26 in leak tight relation with the upstream face of nib 16. This assembly operation is facilitated by the provision of a screw slot 44 at the upstream end of screw pin 36.

A filter which advantageously is formed of perforated sheet material, such as perforated nickel sheet, or wire mesh is provided at the upstream opening of bore 12. In accordance with a preferable embodiment of this invention filter 46 is in the form of a relatively thin disk which is positioned transverse to the direction of the liquid flow at the bore entrance.

Advantageously screw pin 36 is noncylindrical in form, and in one preferred embodiment, is substantially cross-shaped with four arms 56 radially extending from its axial portion. Thus screw pin 36 is provided with the external thread 42 only at the outer circumferential surface of each arm 56 such that when screw pin 36 is threaded into bore 12 a plurality of liquid flow passages 48 are defined between screw pin 36 and housing 10 to permit liquid to flow from the filter 46 at the upstream end of the nozzle to the grooves or slots 30 in nose 28 at the downstream end of the nozzle.

In the preferred embodiment of the invention, housing 10 is provided with external threads 50 at the upstream end thereof and with a hexagonal wrench flange 52 about the center portion thereof to facilitate making connection to the supply line (not shown) through which the liquid will flow to the nozzle. In the operation of the invention the liquid flows from the supply line into the upstream end of the nozzle through filter 46 and continues to flow axially of the nozzle through the flow passages 48 between screw pin 36 and housing 10. The liquid flows from the screw pin through the grooves or slots 30 in frusto-conical nose 28 and out through the orifice 14, being discharged in the form of finely divided droplets. By placing the nose 28 and screw pin 36 in substantially leak tight end sealing engagement where the shoulder 38 of the screw pin abuts the nose the liquid flowing from passages 48 is made to flow through the grooves or slots 30 as desired.

It will be appreciated that since the depth of grooves 30 constitutes the smallest functional dimension of the nozzle, the nozzle will have a tendency to become clogged quite readily at the groves due to the accumulation of objectionable foreign matter therein. This tendency is minimized in accordance with a primary aspect of this invention in which the groove depth is related to the size of the openings in the filter in such a manner as to prevent such particles of foreign matter from entering the nozzle. Thus, the filter is constructed such that each of the openings therein is approximately one-half the depth of slots 30 in nose 28. As a result of this particular critical dimensioning, particles of foreign matter which normally would be sufficient to become lodged in the grooves 30 are prevented by filter 46 from entering bore 12 of the nozzle. This dimensioning is highly important for if the openings in the filter 46 are made the same size as the depth of grooves 30, or larger, the grooves will become clogged rather readily due to the entrance of foreign material. Conversely, if the openings in filter 46 are made substantially smaller than this critical dimensioning, foreign matter in the liquid will be prevented by the filter from plugging the nozzle but such matter will have the detrimental effect of speeding up the contamination and plugging of the filter itself. Manifestly this not only reduces the life of the filter and necessitates frequent replacement thereof but in addition the performance of the nozzle is seriously impaired.

A further problem which arises when the nozzle is utilized for the spraying of fuel oils and the like is the clogging of the nozzle due to the cracking and sludge formation of the fuel oil resident within the nozzle. Additionally, a phenomenon known as "afterdrip" due to the expansion of the fuel oil in the nozzle after burner shutdown also is a source of difficulty. In accordance with a further important aspect of this invention these difficulties are minimized by the construction of screw pin 36. Thus, screw pin 36 not only is adapted to be readily inserted within the nozzle in end sealing engagement with nose 28 to facilitate the ready assembly of the nozzle, but in addition the screw pin 36 is constructed to take up as much space as possible in bore 12 within nozzle housing 10. Consequently the amount of oil resident within the nozzle is reduced to a minimum.

It will be appreciated that the nozzle and filter assembly of the instant invention may be constructed in a unitary composite manner with the filter locked in to prevent contamination and tampering. Thus, after distributor plug 26 is inserted into bore 12 from the upstream end of the nozzle, screw pin 36 is threaded into bore 12 in supporting and end sealing engagement with distributor plug 26 and filter 46 is locked into bore 12 at the upstream end of housing 10. In the preferred construction shown in the drawing the locking means for retaining filter 46 within the housing is provided by rolling the upstream edge of the nozzle over the edge of the filter to form a flange 54. It will be appreciated that this particular construction eliminates the need for a retaining ring for the filter. However, other suitable means for retaining filter 46 may be used for this purpose.

The materials from which the nozzle and filter assembly are made are preferably metals chemically resistant to the liquids being forced therethrough. Changes in the construction of the above described composite unitary spray nozzle and filter assembly and in the materials from which the parts are made will be apparent to those skilled in the art without departing from the spirit of this invention. The embodiments shown and described herein are intended only as specific illustrative examples of the invention and are not intended to be limiting other than as necessitated by the scope of the appended claim.

What I claim as new and desire to secure as Letters Patent of the United States is:

A composite unitary spray nozzle and filter assembly for fuel oil and the like including in combination a housing having an axial bore therein terminating in a central discharge orifice, a distributor plug having a nose with grooves in the surface thereof for directing fuel oil flow through said orifice, means for minimizing clogging of the nozzle due to resident oil therein, said means comprising a screw pin positioned in said axial bore in supporting engagement with said distributor plug, said screw pin being shaped to substantially fill said bore and further to define a plurality of liquid flow passages between said screw pin and the wall of said bore, and a foraminous filter disc secured to the inlet end of the housing transverse to the direction of liquid flow, said filter disc having a plurality of uniformly-sized circular openings each approximately equal in size to one-half the depth of said grooves in said distributor plug to the end that clogging of said grooves due to the presence of foreign matter in said fuel oil is minimized.

References Cited in the file of this patent

UNITED STATES PATENTS

| | | |
|---|---|---|
| 1,940,171 | Huss | Dec. 19, 1933 |
| 2,107,601 | Davis | Feb. 8, 1938 |
| 2,556,493 | Fairfield et al. | June 12, 1951 |
| 2,560,799 | Johnson | July 17, 1951 |